Sept. 6, 1927.
E. W. FLETCHER
1,641,842
INSULATING MEANS FOR STORAGE BATTERY PLATES AND SEPARATORS
Filed Oct. 11, 1926
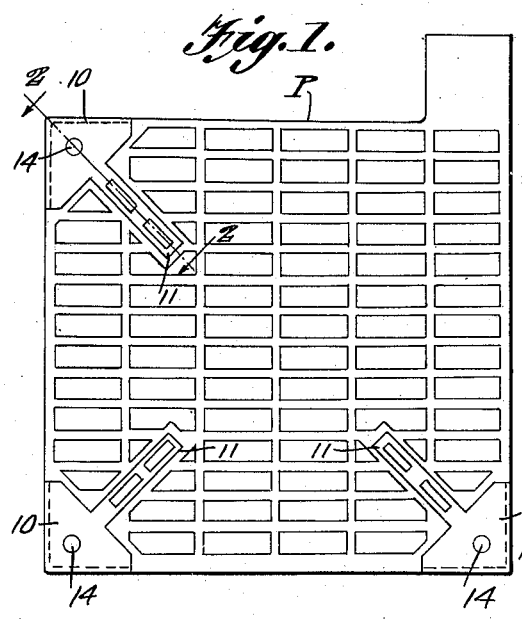
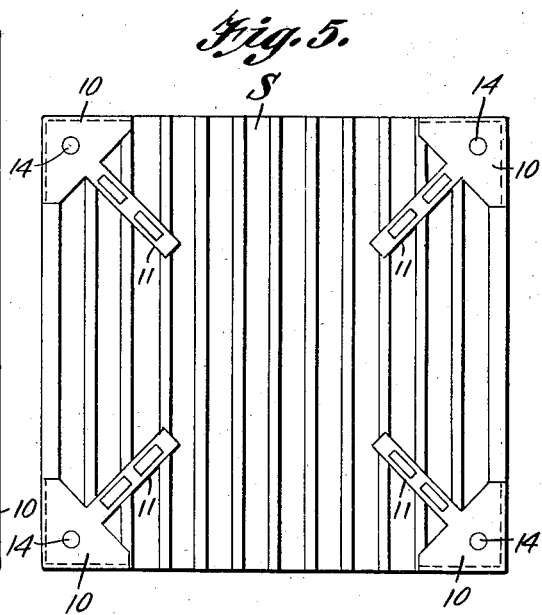
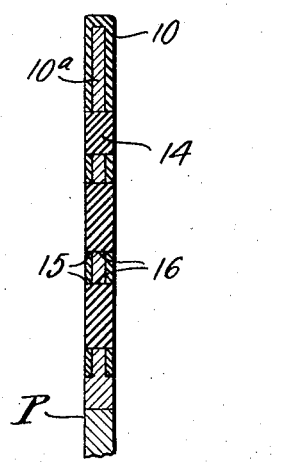
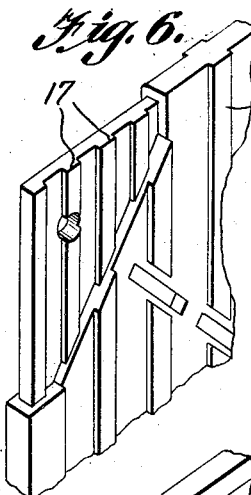
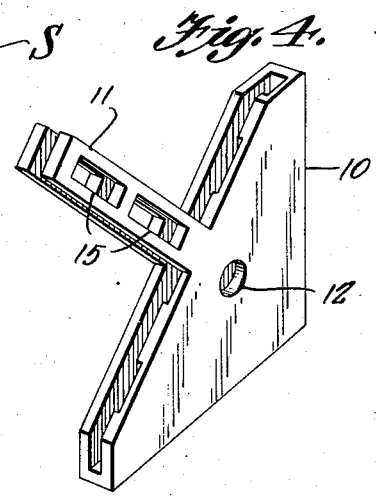
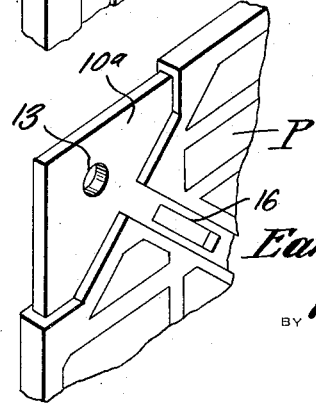
Earl W. Fletcher, INVENTOR Patented Sept. 6, 1927.

1,641,842

UNITED STATES PATENT OFFICE.

EARL W. FLETCHER, OF CUERO, TEXAS.

INSULATING MEANS FOR STORAGE-BATTERY PLATES AND SEPARATORS.

Application filed October 11, 1926. Serial No. 140,949.

This invention relates to the construction of storage batteries, particularly to the plates therefor and the separators located between the plates, and has for its object the provision of storage battery plates and separators provided at their corners with insulating members of hard rubber or other equivalent material which will act positively to prevent short circuiting of the plates in the event that they become warped, as usually happens after prolonged use.

It is well known that after storage batteries are in service and have been used for generally less than a year, the positive plates buckle, a condition which brings the corners thereof into such close engagement with the wooden separators commonly provided between the plates that the wooden separators become worn through at these points, resulting in short circuiting of the plates and deadening of the cells so that the battery becomes useless until repaired.

It is with the above facts in view that I have designed the present invention which has for its object the provision of cap members adapted to be formed onto the corners of the plates and the separators during the manufacture thereof, these cap members being of insulating material harder than wood and consequently able to stand the wear and pressure applied thereto without breaking down, so that even though the plates do buckle they will not come in contact and become short circuited.

An important object is the provision of a battery plate or separator embodying the invention which will be simple and inexpensive in manufacture, just as easy to apply as an ordinary type, efficient and durable in use, and a general improvement in the art.

With the above and other objects and advantages in view, the invention consists in the details of construction, the combination and arrangement of parts to be hereinafter more fully described and claimed, and illustrated in the accompanying drawings, in which:

Figure 1 is a side elevation of a storage battery plate embodying the invention.

Figure 2 is a detail sectional view taken on the line 2—2 of Figure 1.

Figure 3 is a fragmentary perspective view of a plate with the cap member at the corner removed.

Figure 4 is a detail perspective view of the cap member alone.

Figure 5 is a side elevation of one of the separators equipped with the protective corner members, and Figure 6 is a fragmentary perspective view of one of the separators showing the corner thereof with the cap removed.

Referring more particularly to the drawings, the letter P designates a storage battery plate and S designates one of the wooden separators used between the successive plates in the usual manner.

In accordance with the invention, I provide the plate P with caps designated generally by the numeral 10 upon the three corners of the plate other than the single one having the usual lug L thereon. The cap 10 is shown as of triangular shape provided with spaced tongues or extensions 11 and is formed preferably of hard rubber though capable of being constructed of some other material having similar characteristics in point of insulating value and durability. In actual practice the cap would probably be molded or cast in place during the manufacture of the plate so as to be flush with the sides thereof. When the plate is considered with the cap removed, as shown in Figure 3, it will be observed that there is a reduced portion 10$^a$ thereof fitting within the cap.

In order that the cap may be retained in position, it is shown as provided at its opposite sides with registering holes 12 and the reduced portion 10$^a$ of the plate is likewise shown as having a registering hole 13, the material from which the cap is formed being either caused to flow through and solidify within these registering holes, or else use being made of a plug 14 of insulating material passed through the registering holes, as illustrated. The tongues 11 are formed with slots 15 registering with slots 16 in the plate for the same purpose. It is immaterial which way the device is formed or what retaining means is provided, the essential feature being the provision of some sort of means for holding the cap in place especially if the cap be formed as a complete and separate device adapted to be mounted upon the corner of the plate.

Instead of the caps being applied to the storage battery plates themselves, it is clear that they may be provided upon the corners of the wooden or other separators, as shown in Figures 5 and 6 and in a similar manner to that above described. The corners of the storage plates and the separators may be provided with ribs 17, if found advisable or necessary, these ribs being accommodated within corresponding grooves in the cap.

In the use of the invention, it will of course be apparent that regardless of whether the cap be arranged upon the corners of the storage battery, or upon the corners of the separator plates, or upon both, the provision of the caps will operate to prevent short circuiting of the plates inasmuch as the caps are of hard rubber or other similar material which is sufficiently durable to withstand the pressure of the corners of the plates in case they become buckled, it being obviously impossible, or practically so, for the caps to wear through and permit the successive plates to come into contact. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

What is claimed is:

1. A storage battery plate provided at a plurality of corners with a cap of insulating material and transverse plugs through the caps and plate to prevent displacement.

2. A storage battery plate provided at a plurality of corners with a cap of insulating material, flush with the plate surface and locked against displacement by transverse plugs for securing the caps in position.

3. A storage battery plate provided at a plurality of corners with a cap of insulating material, and means for securing the caps in position, the caps having their outer surfaces flush with the sides of the plate and the portion of the plate engaged within the cap being reduced in thickness.

4. A storage battery plate having each of its corners except the one having the usual terminal lug reduced along triangular areas, and a cap of molded insulating material covering the corners and extending diagonally of the plate to strengthen the same, and plugs traversing the insulation and plate to prevent displacement of the caps.

In testimony whereof I affix my signature.

EARL W. FLETCHER.